United States Patent Office 3,427,141
Patented Feb. 11, 1969

3,427,141
NITROGEN- AND PHOSPHORUS-CONTAINING
GASOLINE COMPOSITIONS
Clark O. Miller, Willoughby Hills, and Casper J. Dorer, Jr., Lyndhurst, Ohio, assignors to The Lubrizol Corporation, Wickliffe, Ohio, a corporation of Ohio
No Drawing. Continuation-in-part of application Ser. No. 314,639, Oct. 8, 1963. This application Feb. 9, 1967, Ser. No. 614,825
U.S. Cl. 44—63     8 Claims
Int. Cl. C10l 1/26, 1/24, 1/14

ABSTRACT OF THE DISCLOSURE

Compositions prepared by reacting at a temperature below 100° C., a phosphoric acid mono- or diester with a di- or trialkylamine and a partially acylated and oxyalkylated polyalkylene polyamine are useful as gasoline additives to decrease carburetor icing and provide detergency to decrease deposits in the carburetor throttle area.

Related applications

This application is a continuation-in-part of copending application Ser. No. 314,639, filed Oct. 8, 1963 and now abandoned.

Summary of the invention

This invention relates to improved fuel compositions, and more particularly to fuels protected against carburetor icing and comprising a major amount of a hydrocarbon fuel of the gasoline boiling range and about 0.0001–0.05 part by weight, per 100 parts of said fuel, of a product obtained by reacting, at a temperature below about 100° C., (A) A compound having the formula

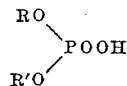

wherein R is an aliphatic hydrocarbon radical having 8–18 carbon atoms and R' is hydrogen or R;

(B) About 0–0.9 equivalent, per equivalent of (A), of an aliphatic secondary or tertiary amine having 2–4 carbon atoms; and (C) About 0.05–2.0 equivalents, per equivalent of (A), of a partially acylated and oxyalkylated amine containing at least one basic nitrogen atom, which amine is formed by reacting (1) a polyalkylene polyamine with (2) an aliphatic carboxylic acid having at least about 12 carbon atoms, and (3) about 1–20%, by weight of the reaction product of (1) and (2), of an aliphatic epoxide having about 2–4 carbon atoms; said product containing about 0.5–2.0 equivalents of basic nitrogen per equivalent of (A).

When internal combustion engines are operated on a gasoline fuel having the desired volatility characteristics for cold weather driving, stalling often occurs during the warm-up period, particularly under cool, humid atmospheric conditions. It has been generally recognized that the cause of repeated engine stalling in cool, humid weather is the formation of ice on the throttle plate and the carburetor valve near it. The water which forms the ice does not come from the gasoline, i.e., as entrained water, but from the air that enters the carburetor. The gasoline which evaporates in the carburetor has sufficient refrigerating effect to condense and freeze the moisture in the air and cause ice particles to build up on the throttle plate and in the carburetor valve. Then, as the engine is idled, the throttle plate closes and the ice chokes off the normal small flow of air through the small clearance between the throttle plate and the carburetor wall, causing the engine to stall.

The stalling of automobile engines in cold weather may also result from the presence of water in the gasoline itself. This water may be introduced during blending operations, during storage by condensation from the atmosphere, or during transportation to the consumer. During cold weather, this water will very often freeze and block the fuel line or plug filters, thus preventing passage of the gasoline to the engine.

Heretofore, these problems have been at least partially overcome by the addition to the gasoline of alcohols, glycols, or similar materials which lower the freezing point of water. However, the effective amount of such additives is in the order of 1 to 3% by volume. Such large concentrations are expensive and frequently affect the chemical and physical properties of the gasoline.

Accordingly, a principal object of this invention is to provide a fuel composition inhibited against ice formation.

Another object is to provide an improved fuel composition which is designed to reduce or eliminate carburetor icing.

Another object is to provide a motor fuel adapted to prevent stalling during engine warm-up in cool, humid weather.

Still another object is to provide an improved gasoline fuel composition which contains a minor amount of a de-icing additive.

Other objects will in part be obvious and will in part appear hereinafter.

The gasoline comprising the major component of the compositions of this invention may be any hydrocarbon or mixture of hydrocarbons falling substantially within the commercial gasoline range, the boiling point of which normally ranges from about 30° F. to about 440° F. Particularly preferred is a mixture of hydrocarbons having an ASTM boiling range of about 140° F. at 10% distillation to about 392° F. at 90% distillation and a Reid vapor pressure of between 11.5 and 15.0 pounds.

Component A

The phosphoric acid which is useful in the preparation of the amine salts of this invention is a partially esterified orthophosphoric acid having the formula

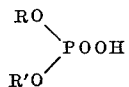

wherein R is an aliphatic hydrocarbon radical having 8–18 carbon atoms and R' is hydrogen or R. Thus, the phosphoric acid may be a monoester or a diester of orthophosphoric acid, or a mixture of mono- and diesters. The latter is preferred for reasons of convenience and economy. Such a mixture can be prepared by the reaction of phosphorus pentoxide with 3 moles of an aliphatic alcohol having from 8 to 18 carbon atoms. The reaction may be illustrated by the following equation:

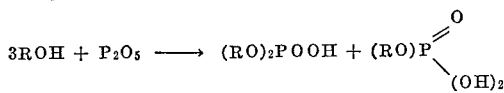

Alternatively, from about 2 to 4 moles of the aliphatic alcohol or a mixture of alcohols can be employed per mole of phosphorus pentoxide.

R is generally an unsubstituted alkyl radical such as octyl, nonyl, decyl, undecyl, dodecyl, tridecyl, tetradecyl, hexadecyl, and octadecyl. Preferably, R is a primary alkyl group, especially a branched primary alkyl group. Examples of alcohols containing such groups are the normal alcohols derived from coconut kernel oils. One such commerically available fraction consists mainly of n-octyl and n-decyl alcohols. Another consists largely of n-dodecyl alcohol but contains other alcohols having from 10 to 18 carbon atoms. Preferably, the alcohol will be a mixture of branched chain primary alcohols such as those produced by the well-known "Oxo" process. Examples of such alcohols include the "Oxo" octyl, decyl, tridecyl and hexadecyl alcohols, all of which are mixtures consisting predominantly of branched chain primary alcohols obtained from propylene-butylene dimer, tripropylene, tetrapropylene and pentapropylene, respectively.

The following examples illustrate the preparation of reagents useful as component A. All parts are by weight.

Example 1

Phosphorus pentoxide (1130 parts) is added slowly, over 5.2 hours, to tridecyl alcohol (4775 parts) at 25–51° C. The molecular ratio of alcohol to $P_2O_5$ is 3:1. The mixture is heated at 60–62° C. for 3 hours. The resulting tridecyl ester of phosphoric acid is filtered and is found to have a phosphorus content of 8.5% and an acid number of 213 at pH 4.

Example 2

Phosphorus pentoxide (1420 parts) is added to decyl alcohol (4740 parts) at 16–29° C. with cooling in an ice bath over a 3-hour period. The molecular ratio of alcohol to phosphorus pentoxide is 3:1. The reaction mixture is heated at 60–65° C. for 1.5 hours and is then filtered. The resulting decyl ester of phosphoric acid has a phosphorus content of 9.9% and an acid number of 222 at pH 4.

Example 3

Phosphorus pentoxide (2928 parts) is added during a 5-hour period to 4-methyl-2-pentanol (6316 parts at 12–28° C. The molecular ratio of alcohol to phosphorus pentoxide is 3:1. The reaction is exothermic and requires external cooling. The reaction mixture is heated at 55–58° C. for 2 hours and the resulting product is filtered. The product is a 4-methyl-2-pentyl ester of phosphoric acid, and has a phosphorus content of 13.7% and an acid number of 278.

Example 4

Phosphorus pentoxide (1876 parts) is added over 1 hour to heptylphenol (1848 parts) at 42–53° C. The mole ratio of phenol to phosphorus pentoxide is 3:1. The reaction is exothermic, requiring external cooling during the addition of phosphorus pentoxide. The reaction mixture is heated at 62–98° C. for 5 hours and is then filtered. The resulting heptylphenyl ester of phosphoric acid has a phosphorus content of 8.1% and an acid number of 208.

Example 5

Phosphorus pentoxide (432 parts) is added over 40 minutes to dodecylphenol (2539 parts) at 23–26° C. The mole ratio of phenol to phosphorus pentoxide is 3:1. The reaction is exothermic. The mixture is heated from 26° to 110° C. over 1.75 hours, held an additional 1.75 hours at 102–110° C., and filtered. The resulting dodecylphenyl ester of phosphoric acid has a phosphorus content of 6.25% and an acid number of 158.

Example 6

Phosphorus pentoxide (2268 parts) is added over 3.5 hours at 18–35° C. to 2-ethylhexyl alcohol (6244 parts). The mole ratio of alcohol to phosphorus pentoxide is 3:1. The reaction is exothermic, requiring cooling. The mixture is heated at 60° C. for 1.5 hours and is then filtered. The resulting 2-ethylhexyl ester of phosphoric acid has a phosphorus content of 11.4% and an acid number of 254.

Example 7

Phosphorus pentoxide (962 parts) is added over 2 hours to n-butyl alcohol (1500 parts) at 20–32° C. The mole ratio of alcohol to phosphorus pentoxide is 3:1. The reaction is exothermic, requiring external cooling during the addition of phosphorus pentoxide. The mixture is heated at 60° C. for an additional hour and is then filtered. The resulting butyl ester of phosphoric acid has a phosphorus content of 16.6% and an acid number of 420.

Component B

The amines useful as component B of the compositions of this invention are the aliphatic secondary and tertiary amines having from 2 to 4 carbon atoms. Examples of such amines include dimethylamine, trimethylamine, methylethylamine, diethlamine, methylpropylamine, and dimethylethylamine. The limitation to secondary and tertiary amines having from 2 to 4 carbon atoms is necessitated by the discovery that primary aliphatic amines form salts which are either insoluble in fuel oils or result in the formation of gels when aromatic solvents such as xylene are used in their preparation.

Component C

As indicated, this component is prepared by reacting a polyalkylene polyamine with an aliphatic carboxylic acid and an aliphatic epoxide. The order in which the latter two compounds are reacted with the polyamine is not critical, but for the sake of convenience it is usually preferred to react the acid first and then the epoxide. (Because of the reactivity of acids with epoxides, it is not possible to add both reagents simultaneously.)

The term "polyalkylene polyamine" is used herein in a generic sense to represent polyamines conforming to the general formula $$H_2N—[(CR''_2)_x—NR''']_yH$$

in which R'' and R''' are hydrogen, alkyl, cycloalkyl, hydroxy alkyl, haloalkyl, aminoalkyl, H(O-alkylene)$_z$, H(N-alkylene)$_z$, etc., wherein $x$ is an integer from 2 to about 10, $y$ is an integer from about 1 to 10, and $z$ is an integer from 1 to about 10. The polyalkylene polyamines include diethylene triamine, triethylene tetramine, tetraethylene pentamine, pentaethylene hexamine, N-(3-aminopropyl)-ethylenediamine, N-(4-aminobutyl)ethylene diamine, trimethylene diamine, tetramethylene diamine, pentamethylene diamine, hexamethylene diamine, di(trimethylene)triamine, N,N-dimethyl propylene diamine, and higher homologs thereof.

The acid which is reacted with the polyalkylene polyamine to form a partially acylated intermediate is an aliphatic carboxylic acid having at least about 12 carbon atoms, preferably about 16–30 carbon atoms. Mixtures of such acids are also useful. Both saturated and unsaturated acids are suitable; examples are dodecanoic acid, palmitic acid, oleic acid, stearic acid, linoleic acid, linolenic acid, naphthenic acid, chlorostearic acid, dichlorostearic acid, and commercially available acids which are obtained by the hydrolysis of tall oil, sperm oil, etc. The acids having from about 16 to about 24 carbon atoms are especially preferred. They include, for example, naphthenic acid having a molecular weight of 200–400, oleic acid, stearic acid, and tall oil acid.

The formation of a partially acylated polyalkylene polyamine having amide or amidine linkage (including cyclic amidine linkage such as are found in imidazolines) may be illustrated by the reaction of octadecanoic acid with diethylene triamine and represented by the following equations:

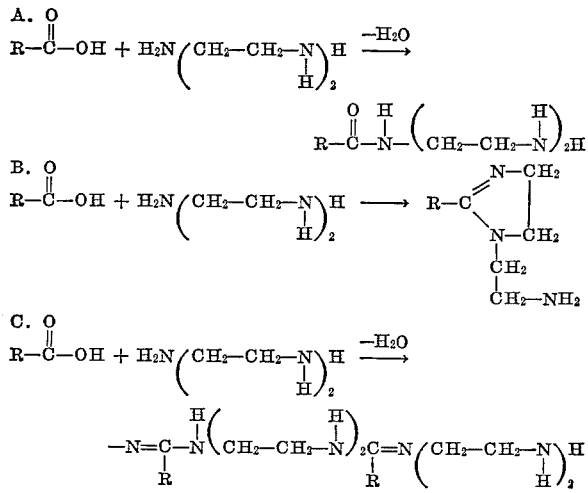

wherein R is a heptadecyl radical.

The reaction of the acid and the polyalkylene polyamine may be carried out by mixing the reactants at a temperature from about 100° C. up to the decomposition temperature of the reaction mixture. The presence of a solvent in the reaction is often advantageous to facilitate mixing and temperature control. The solvent may be a hydrocarbon or an inert solvent. It is illustrated by benzene, toluene, xylene, naphtha, n-hexane, cyclohexane, dodecane, octane, chlorobenzene, ethylene dichloride, dioxane, ether, chloroform, carbon tetrachloride, nitrobenzene, or mineral oil.

The temperature at which the reaction is carried out depends primarily uopn the nature of the reactants used and the product desired. In general, a temperature above 100° C. is used to produce partially acylated polyalkylene polyamines having predominantly amide linkages. A somewhat higher temperature, usually above about 150° C., is preferred to give amidine or imidazoline products.

The realtive proportions of the carboxylic acid and the polyalkylene polyamine depend upon the numbers of nitrogen atoms and hydroxyl groups in the amine reactant, the type of linkages desired in the partially acylated polyalkylene polyamine product, and the stoichiometry of formation of such linkages. As indicated previously, the partially acylated and oxyalkylated polyalkylene polyamines should contain at least one basic nitrogen atom. Thus, where a polyalkylene polyamine has $n$ amino groups and hydroxyl groups per molecule, the maximum amount of the acid reactant to be used will be $(n-1)$ equivalents for each mole of the polyalkylene polyamine used. Preferably, sufficient acid is used to acylate about one-half of the total amino groups in the polyamine. This will require one equivalent of acid for each two equivalents of amine if only amide linkages are formed, but if amidine or imidazoline moieties are present less acid will be needed. (It will be noted that in an amidine or imidazoline, one nitrogen atom is basic although both are acylated.) The equivalent weight of the acid is based upon the number of carboxylic acid radicals in the molecule and that of the polyamine is based upon the number of amino radicals in the molecule. To illustrate, a monocarboxylic acid has one equivalent per mole; ethylene diamine has two equivalents per mole; and tetraethylene pentamine has five equivalents per mole.

The third reactant used in the preparation of component C is an aliphatic epoxide having about 2-4 carbon atoms. Examples of such epoxides are ethylene oxide, propylene oxide, the butylene oxides and epichlorohydrin. If the epoxide is reacted with the amine-acid product, it is used in amounts from about 1% to 20%, preferably 1–5%, of the weight of said product. If the epoxide is reacted with the amine first, it is used in an amount equivalent to about 1–20% of the weight of the amine-acid product. The treatment of the amine or partially acylated amine with the epoxide is usually carried out at a temperature from about 120° C. to about 250° C. A higher temperature, up to the decomposition point of the reaction mixture, may be used. The treatment is preferably effected by introducing small increments of the epoxide to the partially acylated polyalkylene polyamine. The composition of the product of this treatment is not fully understood. It is believed, however, that the product contains a hydroxylated derivative of the partially acylated polyalkylene polyamine.

The following examples illustrate the preparation of substances suitable for use as component C.

Example 8

An alkylene amine mixture (565 parts) consisting of triethylene tetramine and diethylene triamine in weight ratio of 3:1 is added to a mixture of equivalent amounts of a naphthenic acid having an acid number of 180 (1270 parts) and oleic acid (1110 parts) at 20–80° C. The total quantity of the two acids used is such as to provide one equivalent for each two equivalents of the amine mixture. The reaction is exothermic. The mixture is blown with nitrogen while it is being heated to 240° C. in 4.5 hours and thereafter is heated at this temperature for 2 hours. Water is collected as the distillate. To the residue, ethylene oxide (140 parts) is added at 170–180° C. over a period of 2 hours while nitrogen is bubbled through. The reaction mixture then is blown with nitrogen for 15 minutes and diluted with 940 parts of xylene to a solution containing 25% of xylene. The resulting solution has a nitrogen content of 5.4% and a base number of 82 at pH of 4, the latter being indicative of free amino groups.

Example 9

The alkylene amine mixture (565 parts) described in Example 8 is added to oleic acid (2220 parts) at 20–80° C. The quantity of acid used provides one equivalent for each two equivalents of the amine mixture. The reaction is exothermic. The mixture is blown with nitrogen while it is being heated to 240° C. in 4.5 hours and thereafter is heated at this temperature for 2 hours. Water is collected as the distillate. The residue has a nitrogen content of 8.56% and a base number of 122 at a pH of 4, the latter bseing indicative of free amino groups.

To 811 parts of the above residue 2 parts of potassium hydroxide is added, and then 147.5 parts of propylene oxide is introduced at 150–165° C. over a period of 1.75 hours. The reaction mixture is held at 165–170° C. for an additional 0.5 hour. The resulting product has a nitrogen content of 6.90%.

Example 10

To a solution of 734 parts of naphthenic acid (having an acid number of 237) and 867 parts of oleic acid in 281 parts of mineral oil is added, over 10 minutes, 468 parts of the amine mixture used in Example 8. An exothermic reaction occurs and the temperature rises to 80° C. The mixture is heated to 243° C. over 4½ hours and it is then heated for 4 hours at 240–245° C. During this time, 234 grams of mixed aqueous and organic distillate is collected.

The reaction mixture is cooled to 170° C., and 114 parts of ethylene oxide are added below the surface of the mixture at 170–176° C., under nitrogen. The mass is then blown with notrogen and cooled to 93° C., after which 764 parts of xylene are added to form a 75% solution in xylene. The product contains 5.58% nitrogen and has a base number (pH of 4) of 96.5.

The additive composition

The additive compositions of this invention are prepared by simply mixing the components at a temperature below about 100° C. The reaction in most instances is slightly exothermic. Preferably, it is carried out in the presence of a solvent, especially a non-polar solvent such as benzene, naphtha, toluene, xylene, n-hexane, dioxane, chlorobenzene, kerosene or fuel oil.

As used with particular reference to component C, the terms "equivalent" and "equivalent of nitrogen" relate to the basic nitrogen only. Thus, the equivalent weightweight of component C is its molecular weight divided by the number of basic nitrogen atoms in the molecule.

In general, useful compositions are obtained according to the present invention when about 0–0.9 equivalent of B and about 0.05–2.0 equivalents of C are reacted with one equivalent of A; it will thus be noted that B is an optional ingredient. They must also contain a total of about 0.5–2.0 equivalents of basic nitrogen, which may in each individual instance be provided by either B or C, per equivalent of A (calculated on the basis of atoms of acidic hydrogen per molecule). The preferred compositions contain about 0.5–0.9 equivalent of B and a total of about 1.0–1.1 equivalents of nitrogen per equivalent of A, or about 0.5–1.1 equivalents of C alone per equivalent of A. In a still more preferred embodiment, the composition contains about 0.85–0.9 equivalent of B and about 0.1–0.2 equivalent of C, with a total of 1.0–1.1 equivalents of nitrogen, per equivalent of A.

While the exact chemical structure of the compositions prepared as described above is not known, it is believed that they are phosphate salts of the amines used.

In the compounding of the additive compositions of this invention, it is frequently preferred to add other substances such as solvents, demulsifiers and the like.

The preparation of the additive compositions of this invention is illustrated by the following examples.

Example 11

A mixture of 290 grams (1.4 esuivalent) of the product of Example 2 and 1,023 grams (1.4 equivalents) of the product of Example 8 is stirred at room temperature; an exothermic reaction occurs which causes the temperature to rise to 43° C. Xylene, 109 grams, is added and the mixture is stirred for an additional ½ hour. The product thus obtained is a 75% solution in xylene and has a nitrogen content of 3.72% and a phosphorus content of 2.42%.

Example 12

A solution of 130 grams (0.589 equivalent) of the product of Example 6 and 370 grams (0.589 equivalent) of the product of Example 8 in 38 grams of xylene is heated at 90–99° C. for one hour. The product, a 75% solution in xylene, has a nitrogen content of 3.68% and a phosphorus content of 2.77%.

Example 13

A mixture of 88 grams (0.655 equivalent) of the product of Example 7 and 413 grams (0.655 equivalent) of the product of Example 8 is stirred at room temperature, whereupon an exothermic reaction occurs which causes the temperature to rise to 60° C. Xylene, 24 grams, is added and the mixture is heated at 90–97° C. for one hour. The product, a 75% solution in xylene, has a nitrogen content of 4.25% and a phosphorus content of 2.82%, and contains 25% xylene.

Example 14

A mixture of 312 grams (1.23 equivalents) of the product of example 2 and 471 grams (1.23 equivalents) of the product of Example 9 is stirred and cooled in a water bath. The temperature rises to 75° C., whereupon the reaction mixture is heated for ½ hour at 90–100° C. The product contains 4.08% nitrogen and 3.87% phosphorus.

Example 15

A solution of 2,067 grams (7.8 equivalents) of the product of Example 1 and 5,000 grams (7.8 equivalents) of the product of Example 8 in 714 grams of xylene is stirred, whereupon a reaction occurs causing the temperature to rise to 44° C. The product, a 75% solution in xylene, has a nitrogen content of 3.49% and a phosphorus content of 2.21%.

Example 16

A solution of 201 grams (0.75 equivalent) of the product of Example 4 and 364 grams (0.498 equivalent) of the product of Example 8 in 71 grams of xylene is stirred and heated for ½ hour at 60° C. The solution thus obtained is a 75% xylene solution having a nitrogen content of 2.86% and a phosphorus content of 2.53%.

Example 17

The procedure of Example 16 is repeated, except that the equivalent weight ratio of the product of Example 4 to the product of Example 8 is 2:1. The product contains 2.58% nitrogen and 3.13% phosphorus.

Example 18

The procedure of Example 16 is repeated, except that the ratio of equivalents of the product of Example 4 to that of Example 8 is 1:1. The product has 3.37% nitrogen and 2.0% phosphorus.

Example 19

A mixture of 187 grams (0.50 equivalent) of the product of Example 5 and 365 grams (0.50 equivalent) of the product of Example 8 in 66 grams of xylene is stirred at room temperature, whereupon the temperature of the mixture rises to 55° C. The solution is agitated for 4.2 hours and then filtered. The filtrate, a 75.25% solution in xylene, contains 3.0% nitrogen and 1.87% phosphorus.

Example 20

The procedure of Example 19 is repeated, except that the ratio of equivalents of the product of Example 5 to that of Example 8 is 3:2. The product contains 2.46% nitrogen and 2.36% phosphorus.

Example 21

To a solution of 328 parts (1.33 equivalents) of the product of Example 1 in 150 parts of isopropyl alcohol is added 52.5 parts (1.17 equivalents) of dimethylamine, which is introduced beneath the surface of the liquid at 23–65° C. The reaction is exothermic and the mixture is cooled by means of a water bath during the addition. The reaction mixture is stirred for 1½ hours at 65° C., after which time a blend of 116.4 parts (0.19 equivalent) of the product of Example 8 and 3.6 parts of an oxyalkylated demulsifier is added over 15 minutes at 65° C. To the mixture thus formed is added an additional 6.9 parts of the oxyalkylated demulsifier and 6.9 parts of oxyalkylated glycerol. The mixture is then cooled to 38° C. and filtered. The product contains 3.4% nitrogen and 4.3% phosphorus and has an acid number (pH of 12) of 112. The ratio of equivalents of the substituted phosphoric acid to dimethylamine to the product of Example 8 is 1:0.88:0.14.

Example 22

Dimethylamine, 75 parts, is passed into a solution of 500 parts of the product of Example 1 in 328 parts of isopropyl alcohol. After 2 hours, all of the dimethylamine has been reacted; 190 parts of the product of Example 8 is then added over 15 minutes. The reaction product is filtered; there is obtained a homogeneous liquid containing a ratio of equivalents of substituted phosphoric acid to dimethylamine to the product of Example 8 of 1:0.82:0.15. The product contains 30% isopropyl alcohol.

Example 23

The procedure of Example 22 is repeated, except that the amounts of reactants are adjusted to give a ratio of equivalents of 1:0.75:0.27, respectively. The product contains 19.8% isopropanol and 6.8% xylene.

Example 24

The procedure of Example 23 is repeated, except that the amounts of reactants are adjusted to give a ratio of equivalents of 1:0.91:0.05, respectively.

Example 25

The procedure of Example 23 is repeated, except that the product of Example 1 is replaced with an equivalent amount of the product of Example 4. A similar product is obtained.

Example 26

The procedure of Example 23 is repeated, except that the product of Example 8 is replaced with an equivalent amount of the product of Example 9 and the dimethylamine is replaced with an equivalent amount of trimethylamine. A similar product is obtained.

The gasoline additive compositions of this invention are soluble in gasoline and may be incorporated therein simply by mixing them with the gasoline at the desired concentration. Alternatively, they may be dissolved first in a combustible solvent, particularly a hydrocarbon solvent having a boiling point below about 250° C. such as naphtha, benzene, toluene, xylene, gasoline or light mineral oil to obtain a fluid concentrate, and the concentrate may then be diluted with gasoline to obtain the final fuel composition. In many instances, it is convenient to form the salt in the final fuel composition by adding the acidic phosphorus reactant and the amino reactants to the final fuel composition at suitable concentrations. The concentration of the salts in the final gasoline composition usually ranges from about 0.001% to about 0.05% by weight. The preferred concentration is about 0.002% to 0.02%. A higher concentration than 0.05% may be used but is ordinarily unnecessary.

It is believed that much of the bucking and stalling of carbureted gasoline engines, particularly during cool, humid weather, is caused by ice which forms near the circumference of the throttle plate. This ice restricts the flow of the air-gasoline mixture into the combustion chambers and causes an idling engine to stall.

The utility of the compositions of this invention as anti-icing agents for gasoline is shown by means of a laboratory carburetor icing test. The apparatus for this test consists of a 6-gallon cylindrical tower packed with crushed ice, a rudimentary carburetor with attached throttle body and throttle plate, a 30-inch mercury manometer, and 2 vacuum pumps. The carburetor is fashioned from a brass venturi tube into which gasoline is introduced by means of a No. 20 hypodermic needle. The attached throttle body consists of a 1.5-inch outside diameter Lucite tube fitted with a circular brass throttle plate. A hollow cooling jacket surrounds the Lucite tube and the mercury manometer is connected to a tap located at the exit of the Lucite tube. During the operation of the apparatus, cold air is drawn from the iced tower through the cooling jacket by means of one of the vacuum pumps, thus cooling the Lucite tube to 9–13° C. The other vacuum pump, which is attached to the exit of the Lucite tube, draws cold, humid air from the iced tower, mixes it with fuel in the carburetor, and causes the resulting air-fuel mixture to pass through the cooled Lucite tube fitted with the throttle plate. When ice forms on the throttle plate, this is reflected in a sharp increase in the vacuum registered on the manometer. The time required for this increase to occur is a measure of the anti-icing properties of the gasoline; that is, the longer the time, the better the anti-icing characteristics of the gasoline.

The improve anti-icing characteristics secured by incorporating a composition of this invention in a gasoline are clearly shown by this test in the following table.

LABORATORY ANTI-ICING TEST

| Improving agent in the test gasoline (isooctane) | Time in seconds for a sharp increase in vacuum to occur |
|---|---|
| None (control) | 17 |
| 0.006% by weight of the product of Example 12 | 53 |
| 0.008% by weight of the product of Example 13 | 35 |

The effectiveness of fuel additives to prevent engine stalling due to carburetor throttle plate ice formation is also shown by a carburetor icing test performed in the laboratory using a 6-cylinder Chevrolet engine. In this test, air at 46–49° F. and 100% relative humidity is supplied by an air-conditioning and humidifying system to a Stromberg DXOV-2 single barrel carburetor mounted on an 18-inch vertical extension of the intake manifold of a 216 cubic inch 6-cylinder Chevrolet engine. A clear plastic spacer is inserted between the carburetor and the throttle body to permit the observation of ice formation during this test.

In preparation for the test, the engine is supplied with fresh oil and new or cleaned spark plugs, the fuel system is purged, the throttle plate is washed with xylene, the timing of the engine is set at 5° BTC at 500 r.p.m. and the throttle stops are adjusted for the engine to idle at 500 r.p.m. and run at 1750 r.p.m.

During the test the following temperatures are maintained: intake air dry bulb and wet bulb temperature at 46–49° F.; carburetor throttle bore at 28° F.±1° F.

The test procedure is as follows:

(1) The engine is run at 1750 r.p.m. until the throttle plate temperature drops to 30° F.

(2) The engine is stopped until the throttle plate warms to 40° F.

(3) The engine and a stop watch are started simultaneously, and the engine is run at 1750 r.p.m. until it appears that enough ice is built up to cause the engine to stall.

(4) The carburetor heater is turned off and the engine is run for 20 seconds more at 1750 r.p.m. and then returned to idle at 500 r.p.m. for 10 seconds.

(5) If a stall occurs, steps 1 through 4 are repeated reducing the running time at 1750 r.p.m. by ¼ minute increments until the engine will continue to run for 10 seconds at idle. If no stall occurs, steps 1 to 4 are repeated increasing the running time at 1750 r.p.m. by ¼ minute increments until a stall occurs during the idle time of 10 seconds. If no stall occurs in 6 minutes of running time, the fuel is given a rating of 6 plus.

The engine is calibrated before testing with the base fuel and the base fuel plus 1% isopropyl alcohol. The engine is adjusted to stall with the base fuel after 1½±¼ minutes of running at 1750 r.p.m. and to run between 5 and 6 minutes at 1750 r.p.m. before stalling using the base fuel plus 1% isopropyl alcohol.

The improved anti-icing characteristics obtained by incorporating a composition of this invention in a gasoline are clearly shown by this test in the following table.

ENGINE LABORATORY CARBURETOR ANTI-ICING TEST

| Improving agent in the test gasoline (a standard winter grade gasoline) | Time in minutes at 1,750 r.p.m. to stall |
|---|---|
| Test No. 1: | |
| None (control) | 1.50 |
| 1.09% by weight of isopropanol | 5.6 |
| 0.004% by weight of the product of Example 15 | [1] 5.75 |
|  | 5.75 |
|  | 5.50 |
| 0.0024% by weight of the product of Example 15 | [1] 4.50 |
|  | 4.25 |
|  | 4.25 |
| 0.0012% by weight of the product of Example 15 | [1] 3.50 |
|  | 3.75 |
|  | 4.00 |
| Test No. 2: | |
| None (control) | 2.00 |
| 1.09% by weight of isopropanol | 4.92 |
| 0.006% by weight of the product of Example 23 | 4.08 |

[1] Multiple runs.

The additive compositions of this invention are also useful is detergents for the prevention of deposits in the carburetor throttle area. Their effectiveness for this purpose is shown by the Dodge-Falcon Carburetor Deposit Test. In this test, two Falcon carburetors are mounted on a special Y manifold leading to the normal two-barrel manifold. Each carburetor has a removable aluminum sleeve insert and independent fuel system. The engine used is a 1956 Dodge V-8.

Prior to the test, the carburetor sleeves, throttle plates and throat area are thoroughly cleaned and the idle throttle stop clearances of both carburetors are set equally. New or cleaned spark plugs are installed and the engine is charged with 5 quarts of oil. The engine is started with the fuels being tested and the head temperature is brought to 180° F. The spark timing is set at 6° BDTC, 500 r.p.m., with the blowby gases being directed into the atmosphere. The test consists of two 20-hour runs during which the engine is idled at 650 r.p.m. for 8 minutes while the crankcase blowby gas is directed to the carburetor in order to form deposits, after which the engine is idled for ½ minute at 2000 r.p.m. to allow the fuel to wash the deposits away.

After the completion of the test, the deposits formed in each barrel are weighed and removed. The fuels are reversed and the procedure repeated. The results are reported as the percent reduction of deposits of the fuel being tested as compared with the control.

When tested by this method, a gasoline containing 0.004% by weight of the compostion of Example 23 gives 42% reduction of deposits as compared with the control.

In addition to the anti-icing and detergent additives herein described, the gasoline compositions of this invention may contain other additives which are known to those skilled in the art. These additives include anti-knock agents such as tetraalkyl lead compounds; lead scavengers such as the haloalkanes; deposit preventers or modifiers such as the triaryl phosphates; dyes; anti-oxidants such as 2,6-di-tertiary-butyl-4-methylphenol; rust inhibitors such as alkylated succinic acids; bacteriostatic agents; gum inhibitors; metal deactivators; upper cyclinder lubricants; and the like.

What is claimed is:

1. A fuel composition comprising a major amount of a hydrocarbon fuel of the gasoline boiling range and about 0.0001–0.05 part by weight, per 100 parts of said fuel, of a product obtained by reacting, at a temperature below about 100° C., (A) a compound having the formula

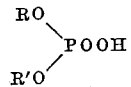

wherein R is an aliphatic hydrocarbon radical having 8-18 carbon atoms and R' is hydrogen or R;
(B) about 0–0.9 equivalent, per equivalent of (A), of an aliphatic secondary or tertiary amine having 2–4 carbon atoms; and
(C) about 0.05–2.0 equivalents, per equivalent of (A), of a partially acylated and oxyalkylated amine containing at least one basic nitrogen atom, which amine is formed by reacting (1) a polyalkylene polyamine having the structural formula

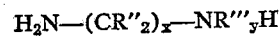

wherein R" and R''' are hydrogen, alkyl, cycloalkyl, hydroxyalkyl, haloalkyl, aminoalkyl, H(O-alkylene)$_z$ and H(N-alkylene)$_z$ wherein $x$ is 2–10 and $y$ and $z$ are 1–10 with (2) an aliphatic carboxylic acid having from 12 to 30 carbon atoms, and (3) at least about 1–20%, by weight of the reaction product of (1) and (2), of an aliphatic epoxide having about 2–4 carbon atoms;

said product containing about 0.5–2.0 equivalents of basic nitrogen per equivalent of (A).

2. The composition of claim 1 wherein component (A) is a mixture of compounds of the formula

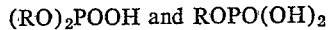

$(RO)_2POOH$ and $ROPO(OH)_2$ wherein R is an aliphatic hydrocarbon radical having 8–18 carbon atoms.

3. The composition of claim 1 wherein component (B) is dimethylamine.

4. The composition of claim 1 wherein component (C) is prepared from a polyethylene amine, an aliphatic monocarboxylic acid having about 16–30 carbon atoms, and ethylene or propylene oxide.

5. A composition according to claim 4 which contains 0 equivalent of (B) and about 0.5–1.1 equivalents of (C) per equivalents of (A).

6. A composition according to claim 4 which contains about 0.5–0.9 equivalent of (B) and a total of about 1.0–1.1 equivalents of nitrogen per equivalent of (A).

7. A composition according to claim 6 which contains about 0.85–0.90 equivalent of (B) and about 0.1–0.2 equivalent of (C) per equivalent of (A).

8. A composition according to claim 1 which comprises a major amount of a hydrocarbon fuel of the gasoline boiling range and about 0.002–0.02 part by weight, per 100 parts of said fuel, of a product obtained by reacting, at a temperature below about 100° C.

(A) one equivalent of a mixture of compounds of the formula

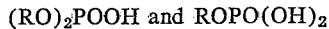

$(RO)_2POOH$ and $ROPO(OH)_2$ wherein R is a primary alkyl radical having about 8–18 carbon atoms;
(B) about 0.85–0.90 equivalent of dimethylamine; and
(C) about 0.1–0.2 equivalent of a partially acylated and oxyalkylated amine containing at least one basic nitrogen atom, which amine is formed by reacting (1) a polyethylene polyamine with (2) a mixture of aliphatic monocarboxylic acids having about 16–30 carbon atoms, and (3) about 1–5% by weight of the reaction product of (1) and (2), of ethylene oxide.

References Cited

UNITED STATES PATENTS 2,974,022   3/1961   Lindstrom et al. _____ 44—56
2,987,522   6/1961   Shen _____ 44—56 XR
3,024,236   3/1962   Hughes _____ 44—63 XR
3,150,941   9/1964   Kautsky et al. _____ 44—63

DANIEL E. WYMAN, Primary Examiner.

WILLIAM J. SHINE, Assistant Examiner.

U.S. Cl. X.R.

44—66, 71, 72